D. BOURQUE.
MACHINE FOR PRODUCING SPRING CARRYING PINS.
APPLICATION FILED SEPT. 20, 1916.

1,309,011.

Patented July 8, 1919.
8 SHEETS—SHEET 1.

Fig. 1.

Inventor:
David Bourque,
by Emery, Booth, Janney & Varney
Attys.

D. BOURQUE.
MACHINE FOR PRODUCING SPRING CARRYING PINS.
APPLICATION FILED SEPT. 20, 1916.

1,309,011.

Patented July 8, 1919.
8 SHEETS—SHEET 6.

Inventor:
David Bourque.
by Emery, Booth, Janney & Varney
Attys.

D. BOURQUE.
MACHINE FOR PRODUCING SPRING CARRYING PINS.
APPLICATION FILED SEPT. 20, 1916.

1,309,011.

Patented July 8, 1919.
8 SHEETS—SHEET 7.

Inventor:
David Bourque,
by Emery, Booth, Janney & Varney
Attys.

D. BOURQUE.
MACHINE FOR PRODUCING SPRING CARRYING PINS.
APPLICATION FILED SEPT. 20, 1916.

1,309,011.

Patented July 8, 1919.
8 SHEETS—SHEET 8.

Inventor:
David Bourque.
by Emery, Booth, Janney & Varney
Attys.

UNITED STATES PATENT OFFICE.

DAVID BOURQUE, OF AMESBURY, MASSACHUSETTS, ASSIGNOR TO G. W. J. MURPHY COMPANY, OF MERRIMAC, MASSACHUSETTS, A CORPORATION OF MASSACHUSETTS.

MACHINE FOR PRODUCING SPRING-CARRYING PINS.

1,309,011.      Specification of Letters Patent.      Patented July 8, 1919.

Application filed September 20, 1916. Serial No. 121,303.

*To all whom it may concern:*

Be it known that I, DAVID BOURQUE, a subject of the King of Great Britain, and a resident of Rocky Hill, Amesbury, county of Essex, and State of Massachusetts, have invented an Improvement in Machines for Producing Spring-Carrying Pins, of which the following description, in connection with the accompanying drawings, is a specification, like characters on the drawings representing like parts.

This invention relates to a machine for producing spring carrying pins. The particular purpose had in view in the embodiment of the invention herein illustrated is the production of headed pins encircled by short helical springs for use in the manufacture of turn button fasteners such as those shown, for example, in the patent to Murphy No. 853,206 and in my Patent 1,201,682.

The invention will be best understood by reference to the following description of one illustrative embodiment thereof taken in connection with the following drawings, wherein:

Fig. 7 is a detail of parts of Fig. 5 in another position which they take during the operation of the machine;

In the drawings Figs. 3, 4, 5, 7 and 15 are on twice the scale of Figs. 1 and 2; Figs. 6, 10, 11, 12, 16 and 17 are on four times that scale and Figs. 8, 9, 13 and 14 eight times.

Characterized briefly, the machine here shown comprises means for providing suitable lengths of spring wire helix, means for separating single pins from a supply and means for bringing together a length of helix and a pin and assembling the same with the former encircling the latter.

Figure 2:
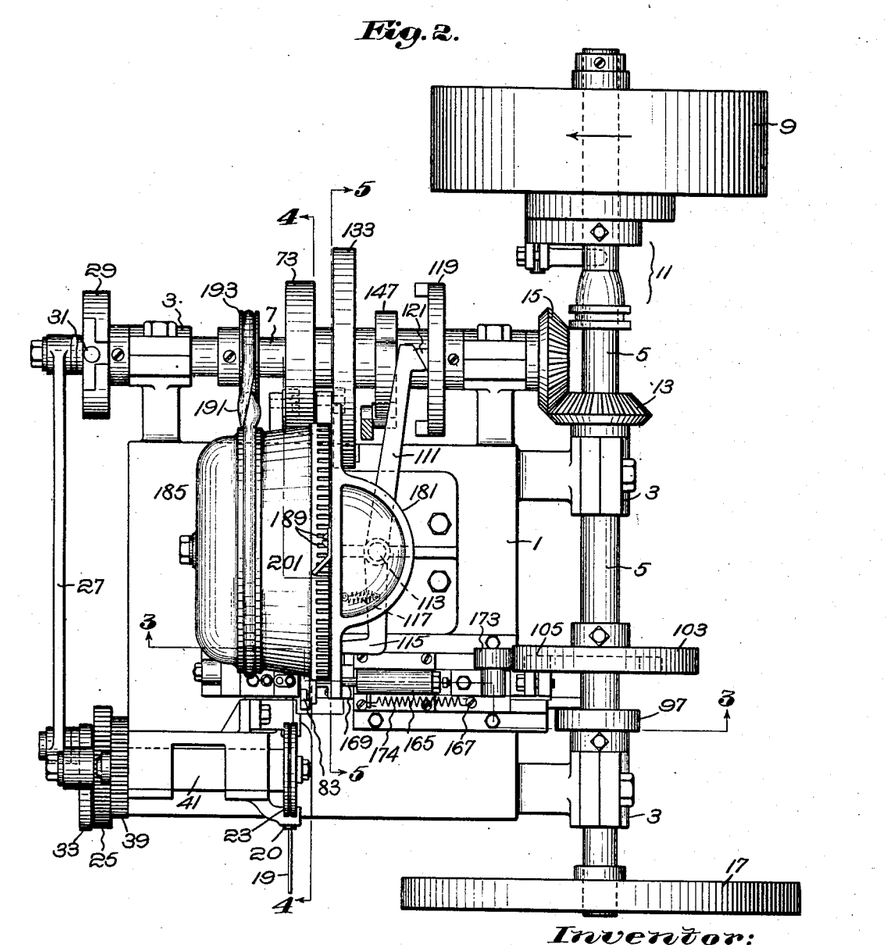
Fig. 2 is a plan view thereof.

In order that the manner of operating the various parts of the machine which I shall hereinafter describe in detail may be more clear I will at first, referring particularly to Fig. 2, describe briefly the arrangement by which the power is applied to the various mechanisms. As shown in Fig. 2 the parts of the machine are mounted on a suitable frame 1 and in brackets 3 extending from this frame are mounted two live shafts 5 and 7, by which are carried various cams, hereinafter to be more specifically referred to, which actuate the various parts of the mechanism. In the embodiment of the invention shown, the shaft 5 is driven by the pulley 9 through any suitable clutch denoted generally by the numeral 11. On the shaft 5 is secured the miter gear 13 meshing with miter gear 15 on shaft 7 which is thereby given motion. The shaft 5 may, if desired, be provided with a hand wheel 17 so that it may be turned over slowly by hand when it is desired to inspect or adjust the parts of the machine.

Figure 1:
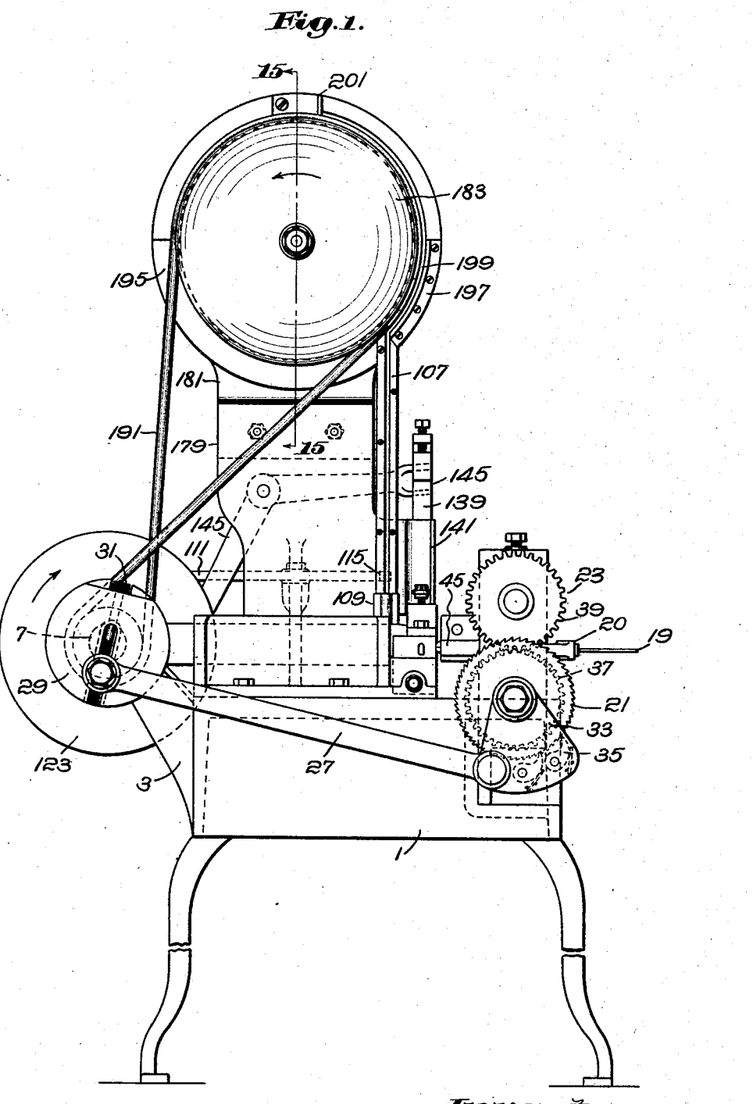
Figure 1 is a side elevation of a machine embodying my invention seen from the left in Fig. 2.
Figure 4:
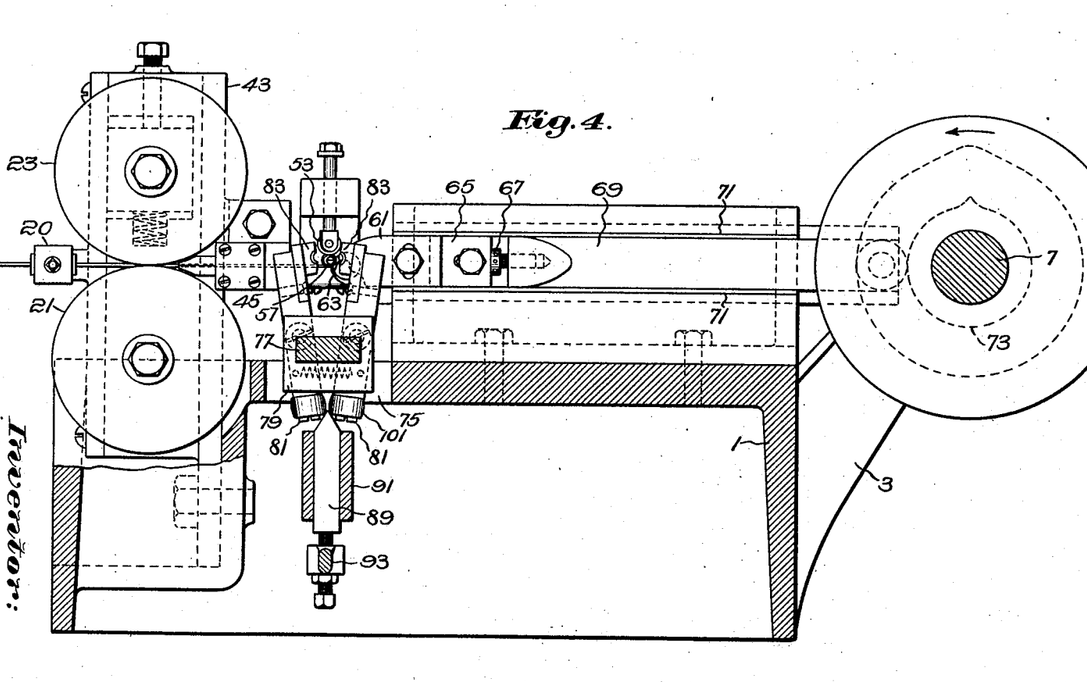

Turning now to the specific mechanism used in the machine illustrated, I will first describe the device which provides the helical springs. In the present embodiment of the invention the machine coils these springs directly from suitable wire. Referring particularly to Figs. 1, 2 and 4, the wire 19 is led into the machine through a guide or fair lead 20 and between suitable feed rolls 21 and 23. The lower feed roll 21 is mounted on a suitable short shaft supported in brackets on the frame 1 and on the other end of this shaft is a ratchet wheel 25. The roll is given suitable intermittent movement from the shaft 7 by the mechanism, best illustrated in Figs. 1 and 2. In those figures a pitman is shown connected eccentrically of the shaft 7 to plate 29 on which it may be adjusted by a screw 31, as shown, to vary the throw thereof. The other end of the pitman is connected to the segment 33 pivoted concentrically with the ratchet wheel 25 and carrying a suitable pawl or pawls 35. It will be understood that as the shaft 7 revolves the ratchet wheel and consequently the feed roll 21 will be given intermittent rotation. The shaft of the roll 21 carries a suitable gear 37 meshing with a like gear 39 on the shaft 41 of the upper feed roll 23. This shaft may be mounted, as shown in Fig. 4, in a box vertically adjustable in bracket 43. It is apparent that by the mechanism described the two feed rolls will turn equally in opposite directions and feed the wire forward step by step across their grooved meeting surfaces and thence to the stationary guide 45 which prevents the wire from buckling or twisting as the rolls deliver it to the coiling mechanism.

Figure 8:
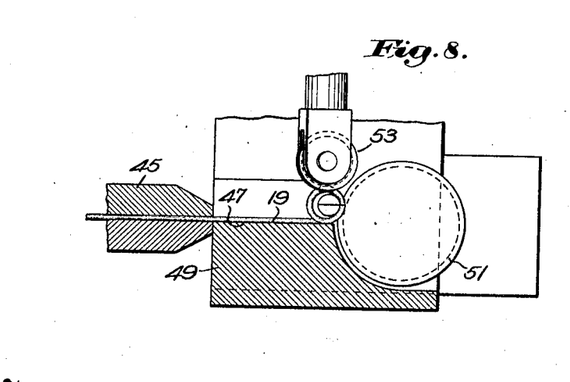
Fig. 8 is a front elevation, partly in section, of the wire coiling device.
Figure 9:
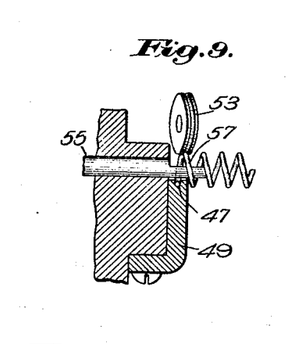
Fig. 9 is a section taken substantially centrally of Fig. 8, parts being omitted.
Figures 10, 11, 12:
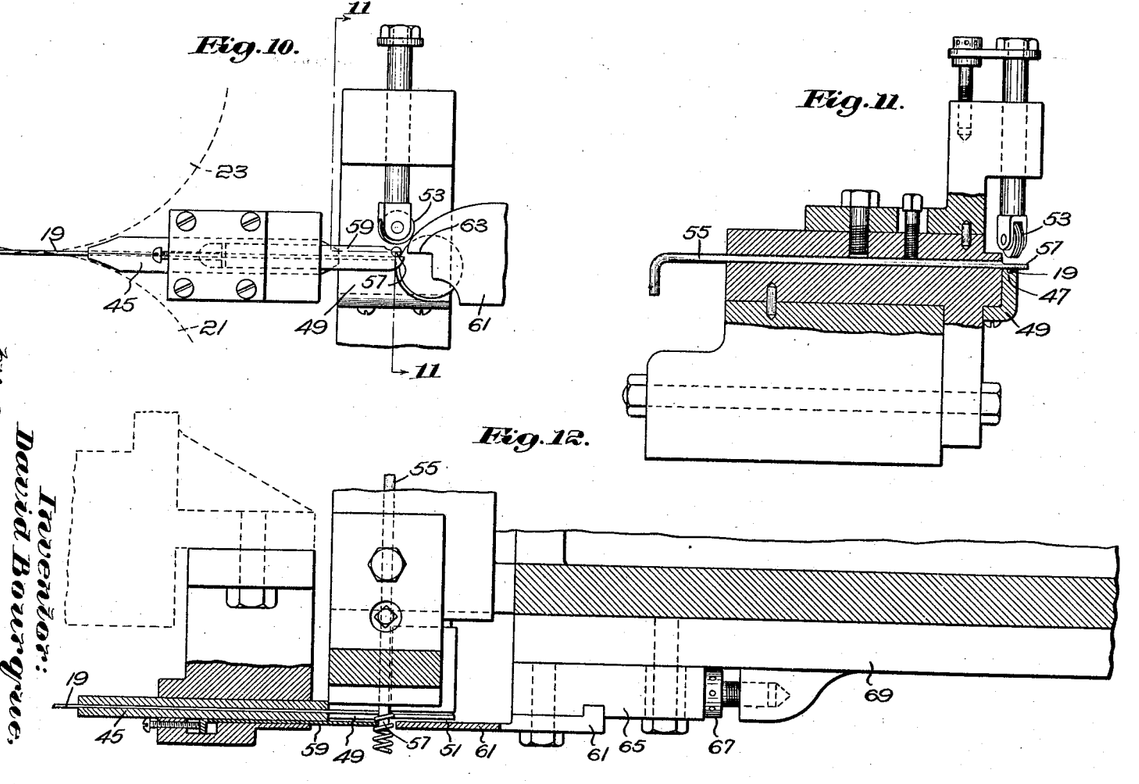
Fig. 10 is a front elevation of the coil severing mechanism.
Fig. 11 is a section on the line 11—11 of Fig. 10.
Fig. 12 is a plan view of the coil severing mechanism partly in section.

Any suitable coiling mechanism may be utilized and in Figs. 8 and 9 there is shown one suitable form which I will now describe. The wire passes from the guide 45 through the groove 47 of a lower supporting guide 49 and enters the peripheral groove of the wheel 51, free to turn clockwise viewing Fig. 8. As the wire 19 is thrust forward by the rolls against the wheel 51 it is apparent that it will be bent over in a counter clockwise direction. Passing from wheel 51 it therefore enters the groove of wheel 53 supported above the same and disposed at such an angle to the wire 19 as will give the desired pitch to the spring coil to be made. It will be well understood by those skilled in the art that the mechanism described will roll, as it were, the end of the wire into a helix which will be fed forwardly, toward the beholder in Fig. 8 or to the right in Fig. 9.

I will next describe the mechanism by which the coil made by the device just described is severed into fixed lengths and will refer particularly to Figs. 4, 10, 11 and 12. In the embodiment of the invention shown the wire is sheared between a fixed blade and a movable cutter which operates periodically. To provide a fixed blade a rod 55 may be extended through the block on which the guide 49 is mounted so that the wire will be coiled about it with one side of the helix close thereto. One end of this rod is cut away as shown at 57 (Figs. 9 and 10) to provide a fixed shearing edge. If desired, the rod may be braced at its free end by a suitable adjustable brace 59, best shown in Figs. 10 and 12, to resist the thrust of the movable cutter blade 61 which coöperates with the cutting edge 57 of the rod and which I will next describe. The cutter 61 is provided with an end 63 adapted to make a shearing cut in coöperation with the cut-away edge 57 of the rod 55. To move this cutter periodically after the feed rolls have fed forward a certain amount of wire which has been coiled by the coiling mechanism, it may be mounted on a block 65 which in turn is adjustable by means of a screw 67 on slide 69 movable in suitable guides 71 supported on the frame 1 of the machine (see Fig. 4). The slide is actuated at proper times by the grooved cam 73 on the shaft 7 which, as best shown in Fig. 4, has a sharp rise at one point which will give the cutter a quick, forward movement to shear the wire and sever the length of coil and immediately retract it.

Figure 3:
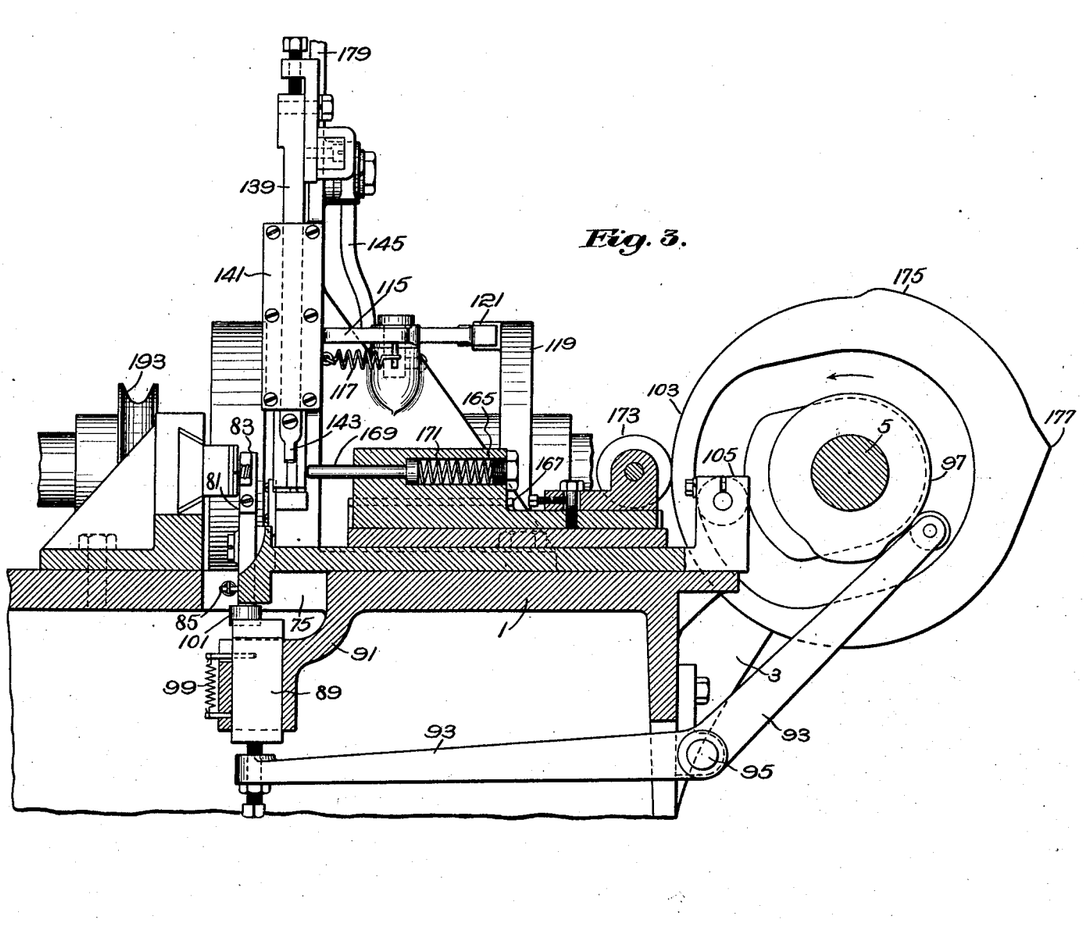
Figs. 3, 4 and 5 are sections on the lines 3—3, 4—4 and 5—5 of Fig. 2 respectively.
Figure 14:
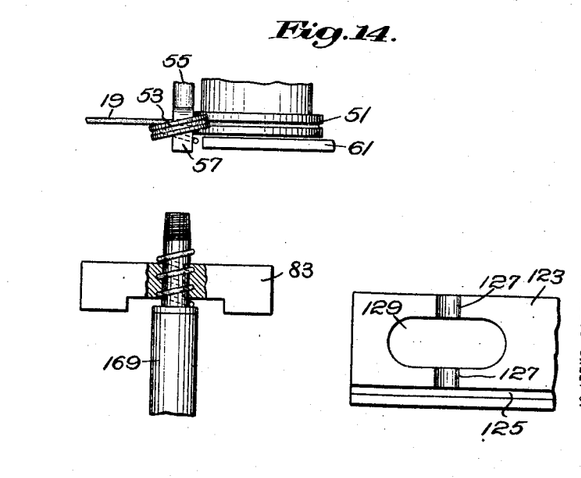

I will next describe the mechanism for handling the several lengths of helix and in doing so will refer particularly to Figs. 3 and 4. In the embodiment shown the helix is taken hold of by two jaws which carry it away from the coiling mechanism to present it to the other mechanisms which assemble it with the pin and to provide room for the coiling of another length of wire upon the next operation of the feed roll. Referring to Fig. 4, the frame 1 is provided with a slot 75 over which moves the slide 77 extending parallel to the axial line along which the wire coil is fed and having a head 79 on which are pivoted two jaw levers 81 which may be provided at their upper ends with removable gripping faces. The slot 75 accommodates the lower ends of these levers. A spring 85 normally holds the gripping jaws separated in the position illustrated in Fig. 4. The faces 83 of these jaws are provided with semi-cylindrical recesses, the bottoms of which are preferably helically grooved, as best shown in Fig. 14, so that they coöperatively form a socket which will receive a length of the helically coiled wire and provide a support therefor against both lateral and endwise movement. One extreme of the travel of the jaws with slide 77 brings them into the position shown in Fig. 3 directly before the cutting mechanism which severs the wire and in position to close on the coil which projects outwardly from the coiling mechanism in the manner illustrated in Fig. 12. Means are provided to bring the jaws together against the action of the spring 85 and in the present instance this is accomplished by a wedge 89 sliding in a guide 91 which depends from the bottom of the frame 1 and arranged to be thrust upwardly between the lower end of the levers 81 whereby to swing the working faces 83 thereof together. This lever is operated by the bell crank 93 pivoted at 95 on the frame and actuated by a cam 97 on the shaft 5. As shown in Fig. 3 this cam has substantially one-half of its circumference formed on one radius and the other half on another so that the wedge 89 will be elevated and remain elevated during half the revolution of the shaft 5 and will be depressed by the action of the spring 99 during the other half. It will be understood that the jaws are timed to close on the coil at the moment that it is severed by the cutter 61 moved by the cam 73.

Means are provided to retract the jaws from the coiling mechanism while still holding them closed on the length of coil which has been severed from the main supply. To permit this movement the wedge 89 is made quite long, as shown in Fig. 3, to allow movement of the jaw mechanism to the right in that figure and the levers may be provided, if desired, with suitable antifriction rollers 101 to facilitate their travel. The slide 77 carrying the jaw levers is moved by means of a suitable cam 103 having a cam groove coöperating with the roll 105 carried by the slide. As clearly shown in Fig. 3, this cam is timed to draw the jaws away from the coiling mechanism when they have been closed on the projecting length of coil by the action of the cam 97 and the circular portion of the groove shown at the right will hold the closed jaws for some time at the opposite end of their travel while the pin and coil are being assembled. At the same time the coiling mechanism is unobstructed and a new length of coil can be formed from the wire fed forward by the next stroke of the ratchet wheel 25 actuating the feed rolls.

Figures 5, 6:
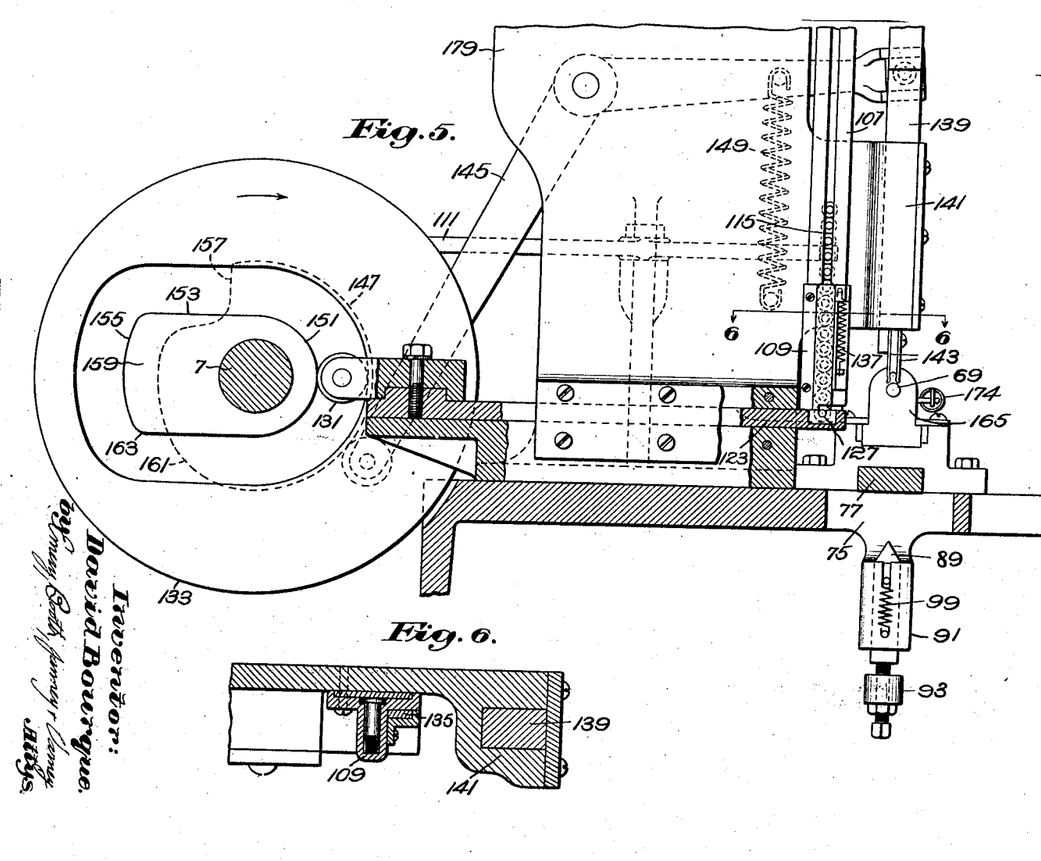
Fig. 6 is a section on the line 6—6 of Fig. 5.
Figure 17:
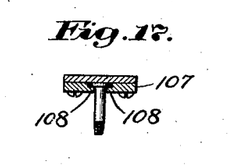
Fig. 17 is a section on the line 17—17 of Fig. 16.

I will next describe the mechanism by which the pins are fed one by one and brought into position to be assembled with the severed lengths of coil. In this description I will refer particularly to Figs. 5, 6 and 7. A suitable magazine to hold a number of pins is provided and in the present instance this magazine takes the form of a vertical guideway or chute 107 having flanges 108 best shown in Fig. 17 adapted to engage the heads of a row of pins piled one on top of the other. At the bottom or delivery end of this chute a guide 109 is preferably arranged which has a passage therethrough corresponding in form both to the head and shank of the pin, as shown in Fig. 6, thereby accurately positioning the same for delivery from the magazine. To assist the passage of the pins down the chute 107 and insure their proper entry into the guide 109 a tapper 111 may be provided, best shown in Fig. 2. This tapper 111 consists of a lever pivoted at 113 and having a head 115 pulled by a spring 117 into contact with the back of the chute. A disk 119 having the lugs 121 thereon at intervals is mounted on shaft 7 and coöperates with the other end of the lever 111, the lugs tripping it against the tension of the spring 117 to cause it to tap against the back of the guide and jar the series of pins so that they will move freely down the chute.

Figure 13:
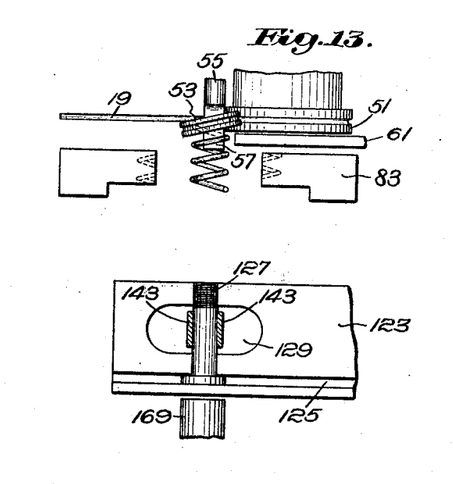
Figs. 13 and 14 are diagrammatic views in plan of parts of the mechanism in different positions, illustrating the operation of the machine.

Referring again to Fig. 5, the pins are fed one by one from the magazine by means of a slide 123 moving transversely to the axial line of the coil held in the jaws 83 and placed beneath the level of the same. As best shown in Figs. 13 and 14, this slide is provided with a groove 125 adapted to receive the head of a pin coming from the chute and grooves 127 to receive the shank of the pin. Where the middle portion of the pin would lie the slide is recessed at 129 for a purpose to be presently described. The slide 123 carries at one end a cam roll 131 coöperating with the groove of a cam 133 on the shaft 7. This cam will move the slide 123 to the left from the position shown in Fig. 5 to bring a pin resting in the grooves 125 and 127 into the same vertical plane as the coil in the jaws 83.

In order that but one pin may escape from the chute 107 at a time and yet to permit the slide to carry the pin away easily the delivery end of the chute is preferably provided with a yielding lip at the right hand side viewing Fig. 5. This lip may consist of a vertical slide 135 mounted on the side of guide 109 and normally pressed downwardly into contact with the face of slide 123 by a spring 137. This slide will yield upwardly to permit the passage of the pin lying in the slide 123 but will prevent the pin immediately above it from being moved out of the guide as well.

Means are provided to bring the pin taken away from the magazine by the slide 123 into axial alinement with the spring with which it is to be assembled. In the present instance this means takes the form of a picker arm 139 vertically slidable in guide 141 and have at its lowermost end the spring fingers 143 adapted on downward movement to embrace the pin presented by slide 123, as shown in Fig. 7. It will be understood that the picker moves in the vertical plane of the coil held by jaws 83.

The picker 139, which is adjustable as shown in Fig. 3, is actuated by the bell crank lever 145 and the cam 147. A suitable spring 149 is attached to the lever and holds the cam follower in contact with the cam 147. In Fig. 5 the parts are shown in one extreme position. As the cam 133 rotates the slide 123 will be held stationary as the roll passes over the circular portion 151 of the cam groove and a pin will be permitted to enter the grooves 125 and 127. At this time the picker 139 is also stationary. As the cam 133 rotates clockwise the surface 153 of the groove will come into play and move the slide 123 to the position shown in Fig. 7 beneath the picker 139. The circular portion 155 of the groove retains the slide in this position while the shoulder 157 of cam 147 permits the spring 149 quickly to depress the picker 139 so that the spring fingers 143 snap over the pin held by the slide, the cutaway portion 129 permitting the entry of the spring fingers. The shoulder 159 of the cam 147 then acts to withdraw the picker to a position slightly lower than that shown in Fig. 5 and the surface 161 holds it in that position until the pin and the coil are brought together. The part 163 of the groove in cam 133 returns the slide 123 to the position shown in Fig. 5. For a ready understanding from the drawing of the action of cams 133—147 it should be noted that the followers bear on these cams at different positions so that the parts which act together are not in alinement.

By the mechanism hitherto described a portion of wire has been formed into a coil of given length which has been received and held by the jaws 83 and a pin has been taken by the picker 139 and brought into alinement with the opening between such jaws. The next operation of the machine is to cause relative axial movement of the coil and the pin to bring them together. In the present embodiment of the invention the travel of the jaws to the right in Fig. 3 brings the coil over the end of the pin held by picker 139 which enters the recesses between them and a plunger is utilized to drive the pin home. I will now describe this mechanism referring particularly to Fig. 3. A slide 165 is mounted in guides 167 to move longitudinally in the same general direction as that in which extends the axial line of the coil held in the jaws 83 and a striking head 169 is mounted in the slide 167 and may conveniently be supported by a spring 171, as shown, so as to give a cushioned blow. The head 169 is accurately in alinement with the opening between the jaws 83 and with the pin held by the picker when the latter is held stationary by the portion 161 of cam 147. A roll 173 may be adjustably mounted on one end of the slide 165 and a suitable cam is provided on the shaft 5 to move the slide against the action of spring 174 which normally holds it to the left in Fig. 3 (see Figs. 2 and 5). In the present instance the cam 103 is also a surface cam and actuates the slide 167. As the cam revolves counter clockwise (viewing Fig. 3) the rise 175 will cause the slide 167 to travel to the left and move the head 169 close to the head of the pin presented by the picker and support it as it enters the recess between the jaw 183 where it tightly fits the spring. The rise 177 of the cam will give a final thrust to the slide 165 to drive the pin home.

Referring particularly to the diagrammatic Figs. 13 and 14, the cycle of movements of the various parts already described in detail may now be set forth. Referring to Fig. 13, the jaws 83 are spread apart and are held stationary by the cam groove 103. The wire feed rolls 21 and 23 will be moved to feed the wire 19 to the left and the parts 49, 51 and 53 will operate to coil a number of spires which are fed forward or downwardly viewing Fig. 3. While this is taking place the slide 123 has been moved to the position shown in Fig. 13 and the picker 139 depressed so that the spring fingers 123 seize on the pin carried therein. As the ratchet makes its return movement and the wire feed stops the cutter 61 is moved forward and coöperates with the edge 57 of rod 55 to shear off a length of the coil and at the same time the jaws 83 close thereon. The severed length of coil is now moved to the position shown in Fig. 14 by the action of the slide 77 moved by cam groove 103 and the slide 123 is withdrawn, as shown. At this point the shoulder 175 (Fig. 3) comes into play to move forward the plunger head 169 and support the pin as the jaws 83 carrying the coil move over the end thereof. The picker is then retracted upwardly and the rise 177 of the cam thrusts forward the head 169 to drive the pin home, as shown in Fig. 14. The cam 97 now releases wedge 89 to the action of spring 99 and the jaw levers are swung open by spring 85 allowing the assembled spring and pin to drop through slot 75. The spring fits the pin closely enough to prevent its dropping off. During the half cycle thus commenced the jaws are returned to the position shown in Fig. 3, the wire is again fed to the coiling mechanism which feeds forward a new length of spring to be seized by the jaws, and another pin is brought from the magazine and delivered to picker 139.

Figure 15:
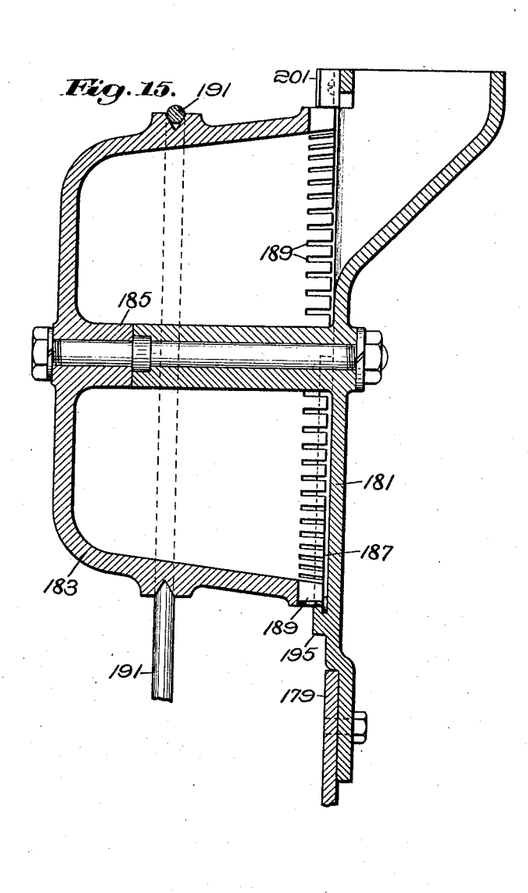
Fig. 15 is a section on line 15—15 of Fig. 1.
Figure 16:
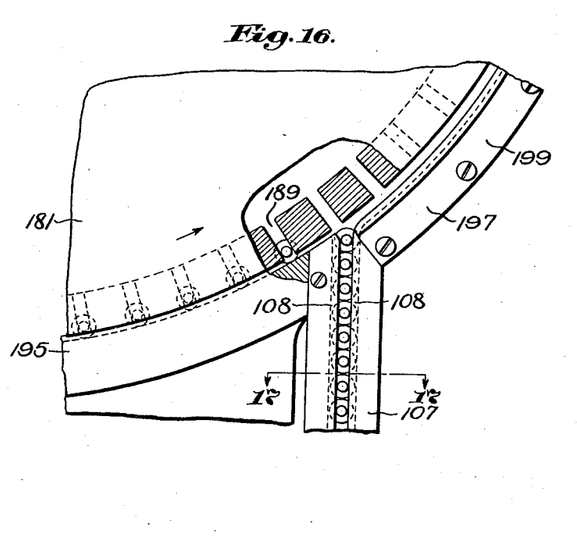
Fig. 16 is a view of part of Fig. 15 as seen from the left and partly broken away.

While the pins may be supplied to the magazine or chute 107 in any suitable manner, I preferably provide automatic means for feeding them thereto. A suitable device for this purpose is shown in Figs. 1, 15, 16 and 17. Secured to the standard 179 of the frame 1 there is a plate 181 which constitutes one side of a pin receiving hopper. The rest of this hopper is formed by the cup-shaped member 183 rotatably mounted on a bearing 185 carried by the plate 181. A clearance 187 is provided between the rim of this cup shaped member and the plate 181 is just large enough to admit the heads of the pins, as shown in Fig. 15. The rim of the member is also pierced with radial slots which will admit the shanks of the pins, as also shown in that figure. It will be apparent that if a number of pins are agitated in the hopper formed coöperatively by the plate 181 and the member 183 that some will shake into the position shown in Figs. 15 and 16 with their heads resting in the clearance space 187 and their shanks in the slots 189 and supported by the flange 195 on the blade 181. This agitation is provided for by the rotation of the member 183 on the bearing 185 which may be accomplished by the belt 191 extending from a pulley 193 on the shaft 7. This rotating movement will serve to bring one pin after another in the recesses 189 to the upper end of the chute 107 at which location the flange 195 is cut away to permit the pins to fall from the recesses into the chute. Their heads are properly positioned to be engaged by the overhanging flanges 108 thereof and they are thus properly assorted and positioned to be taken one by one by the slide 123 and presented to the picker 139, as already described. To permit a larger supply of properly arranged pins to be brought together than can be accommodated by the chute 107 alone, the flange 195 is replaced on the farther side of the chute by an angle iron 197 the outwardly extending flange of which has a greater radius than the inner surface of flange 195 and therefore provides a support for the shanks of pins which may pile up above chute 107 in the space 199.

If the chute 107 and space 199 are full, certain pins in the spaces 189 may be carried along to the upper part of the hopper. Ordinarily the superfluous pins will simply drop back into the hopper but they may tip slightly and stick in such a position that they cannot readily enter the chute on the next revolution and there is a possibility that the apparatus might be jammed. I therefore preferably provide an abutment member 201 adjacent the top of the hopper which will strike the projecting heads of the pins and dislodge them so that they will fall back into the hopper. The abutment member may extend diagonally over the rim of cup shaped member 183, as clearly shown in Fig. 2.

It will have become apparent from the description given that I have provided a very efficient machine for assembling male members such as pins with encircling female members. Furthermore, since in the embodiment described a pin is taken from a supply, a length of spring provided and the two assembled in a single cycle on each rotation of the power shaft, the machine is capable of very rapid production. While I have described in considerable detail the form of machine shown, it will be understood that I have done so in order that the construction and operation of the same might be more readily understood and not because the particular mechanical elements illustrated or the exact arrangement and combination thereof are essential. Obviously these might be considerably varied, but what I do claim and desire to secure by Letters Patent is:—

1. A machine of the class described comprising mechanism to receive and hold a length of coiled wire from a supply, a pin magazine, a device for feeding pins one by one from said magazine, a picker to transfer pins from said device into axial alinement with the coil in said receiving mechanism and means to bring together the alined pin and coil.

2. A machine of the class described comprising mechanism to receive and hold a length of coiled wire from a supply, a pin magazine, a device for feeding pins one by one from said magazine, a picker having jaws adapted to embrace a pin fed by said device, said picker having movement to bring said pin into axial alinement with the coil in said receiving mechanism and means to bring together the alined pin and coil.

3. A machine of the class described comprising mechanism to receive and hold a length of coiled wire from a supply, a pin magazine, a device for feeding pins one by one from said magazine, a picker having spring jaws adapted to be pressed apart by and to close on a pin fed by said device, said picker having movement to bring said pin into axial alinement with the coil in said receiving mechanism and means to bring together the alined pin and coil.

4. A machine of the class described comprising a reciprocating plunger, mechanism to present a length of coiled wire in the path of said plunger coaxially therewith, a pin magazine and means to feed pins one by one from said magazine into the path of the plunger.

5. A machine of the class described comprising a mechanism for coiling wire into a helix the helix being fed axially forward as formed, a pin supplying mechanism arranged to bring pins one by one into alinement with the helix, a driver to insert each pin in the helix and a cutter to sever the helix as often as a pin is inserted.

6. A machine of the class described comprising a mechanism for feeding a helix axially forward, a pin supplying mechanism arranged to bring pins one by one into alinement with the helix, a driver to insert each pin in the helix and a cutter to sever the helix as often as a pin is inserted.

7. A machine of the class described comprising wire coil handling means, a pin magazine arranged to contain a series of pins, a slide arranged to feed pins one by one from said series, a picker adapted to carry pins presented by said slide into alinement with the coils presented by said handling means and means to bring together an alined pin and coil.

8. A machine of the class described comprising wire coil supply mechanism to provide helical coils of fixed length, coil handling means including relatively movable jaws coöperatively forming a socket to hold a coil and means to separate a pin from a bulk thereof and to insert the same in said socket.

9. A machine of the class described comprising a mechanism to feed forward a helical coil of wire, means providing lateral support for the coil so fed, means to separate a pin from a bulk thereof and to insert the same in the coil so supported and a cutter arranged to sever the helix as often as a pin is inserted.

10. A machine of the class described comprising a wire coil supply mechanism to provide helical coils of fixed length, coil handling means arranged to receive the coils *seriatim* from said supply mechanism and providing support for the same against lateral and endwise movement and means to separate a pin from a bulk thereof and to insert the same in the coil.

11. A machine of the class described comprising a wire coiling mechanism, means to sever a determined length of coil, a pin magazine, means to bring a pin and a severed coil into axial alinement and means to cause relative axial movement thereof to produce a spring encircled pin.

12. A machine of the class described comprising a wire coiling mechanism, means to sever a determined length of coil, a pin magazine, means to bring a pin and a severed coil into axial alinement and a plunger arranged to drive said pin into said spring.

13. A machine of the class described comprising jaws arranged temporarily to hold a length of coiled wire, a pin magazine, means to bring a pin from said magazine and a coil held by said jaws into axial alinement and means to cause relative axial movement thereof.

14. A machine of the class described comprising separable jaws arranged to receive a length of coiled wire, a picker arranged to engage a pin and present it to the opening of said jaws and a plunger constructed and timed to drive the pin into said opening.

15. A machine of the class described comprising means to feed forward wire in a helical coil, a periodically operated cutter to cut off definite lengths of the coil, coil handling mechanism comprising a jaw having a recess to receive the severed length, said jaw being movable to and from said coil feeding means to take and carry the severed length from said means, a coöperating member to hold said length in position on the jaw, a pin holder member constructed to present a pin in axial alinement with the length of coil carried by said jaw, means to feed pins thereto one by one and means to bring together the alined pin and length of coil.

16. A machine of the class described comprising means to feed forward wire in a helical coil, a periodically operated cutter to cut off definite lengths of the coil, coil handling mechanism comprising separable jaws having mating semi-cylindrical recesses therein, said jaws being movable to and from said coil feeding means to take and carry the severed length from said means, a pin holder constructed to present a pin in axial alinement with the length of coil carried by said jaws, means to feed pins thereto one by one, and means to bring together the alined pin and length of coil.

17. A machine of the class described comprising means to feed forward wire in a helical coil, a periodically operated cutter to cut off definite lengths of the coil, coil handling mechanism comprising separable jaws having mating semi-cylindrical recesses therein, the walls of said recesses being helically grooved to fit said coil, said jaws being movable to and from said coil feeding means to take and carry the severed length from said means, a pin holder constructed to present a pin in axial alinement with the length of coil carried by said jaws, means to feed pins thereto one by one, and means to bring together the alined pin and length of coil.

18. A machine of the class described comprising mechanism for supplying lengths of coiled wire, a traveling member arranged to receive such lengths therefrom at one period of its travel and hold the same, mechanism for presenting pins with their ends extending toward such member and their length along the path thereof whereby said holder in its travel will carry the coil into encircling relation to the pin.

19. A machine of the class described comprising mechanism for feeding forward lengths of coiled wire, a traveling mechanism including a pair of jaws arranged to close laterally on the length delivered thereby, a mechanism for presenting pins with their ends extending toward such member and in the path of the coil carried thereby whereby said holder in its travel will carry the coil into encircling relation to the pin.

20. A machine of the class described comprising wire coiling means, means to sever the coil, a mechanism for bringing a pin from a supply and holding it with its end extended in position to receive a coil thereabout, and a member moving to and fro between said coiling means and said mechanism and having provision for taking hold of a length of coil at one end of its travel and for releasing the same in encircling position on the pin at the other.

21. A machine of the class described comprising wire coiling means, means to sever the coil, a mechanism for bringing a pin from a supply and holding it with its end extended in position to receive a coil thereabout, and a member moving to and fro between said coiling means and said mechanism and having provision for taking hold of a length of coil at one end of its travel and for releasing the same in encircling position on the pin at the other and a driver to drive home in the coil the pin introduced therein by the said member.

22. In a machine of the class described, means for temporarily holding individual pins, means for guiding a wire transversely of the axis of said pins and wire coiling means arranged helically to coil the wire about the axial line of the held pin.

23. In a machine of the class described, means for supplying individual pins to the vicinity of an operating point including a chute or raceway and a separating device, means for clamping on an individual pin to present the same in a definite axial line, wire coil supply means, and a coil carrier movable along said axial line.

24. A machine of the class described comprising means for separating individual pins from a supply and wire coiling means coöperating therewith to provide a coil arranged in encircling relation on the pin.

In testimony whereof I have signed my name to this specification.

DAVID BOURQUE.

Copies of this patent may be obtained for five cents each, by addressing the "Commissioner of Patents, Washington, D. C."